Oct. 26, 1948.    T. WILSON    2,452,343
APPARATUS FOR HOT SAWING
Filed May 23, 1942    3 Sheets-Sheet 1
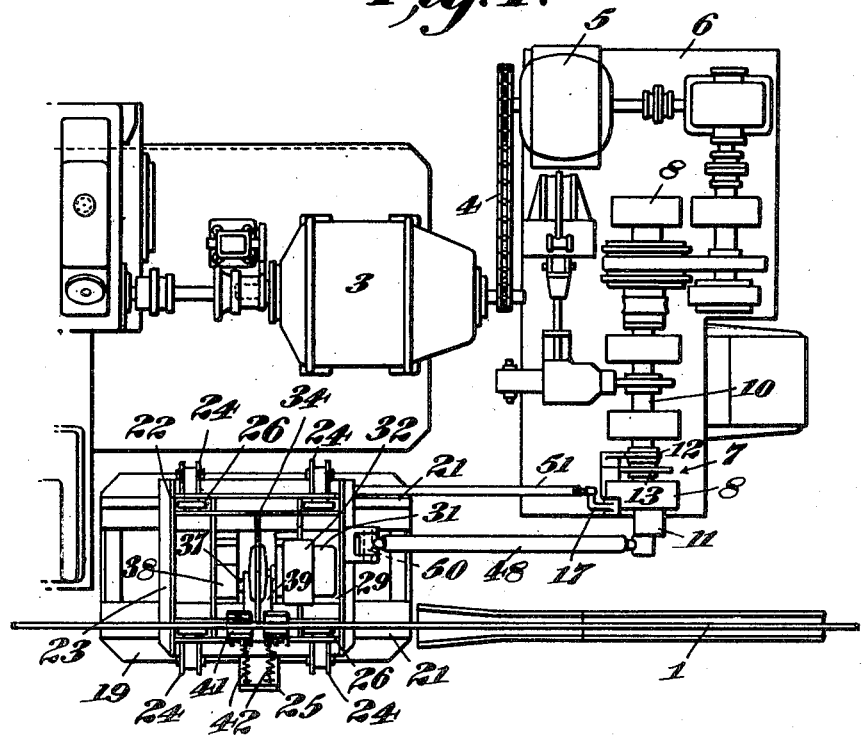
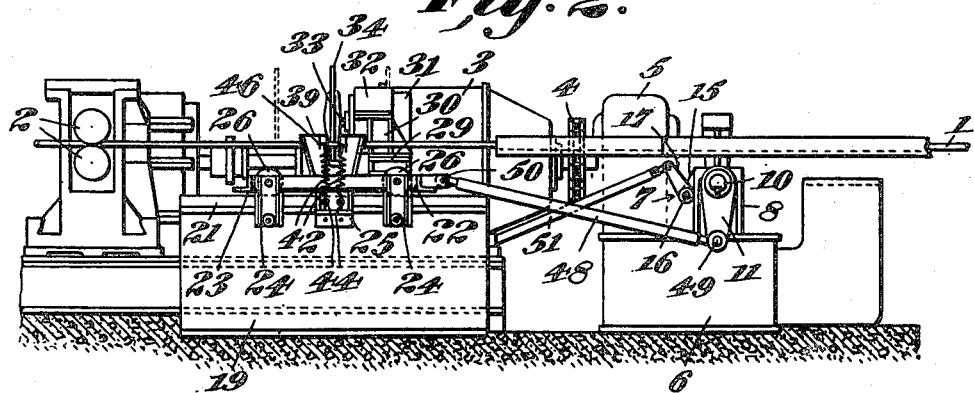
Inventor
Tom Wilson.
By P. S. A. Dougherty
Attorney Oct. 26, 1948.     T. WILSON     2,452,343
APPARATUS FOR HOT SAWING
Filed May 23, 1942     3 Sheets-Sheet 3
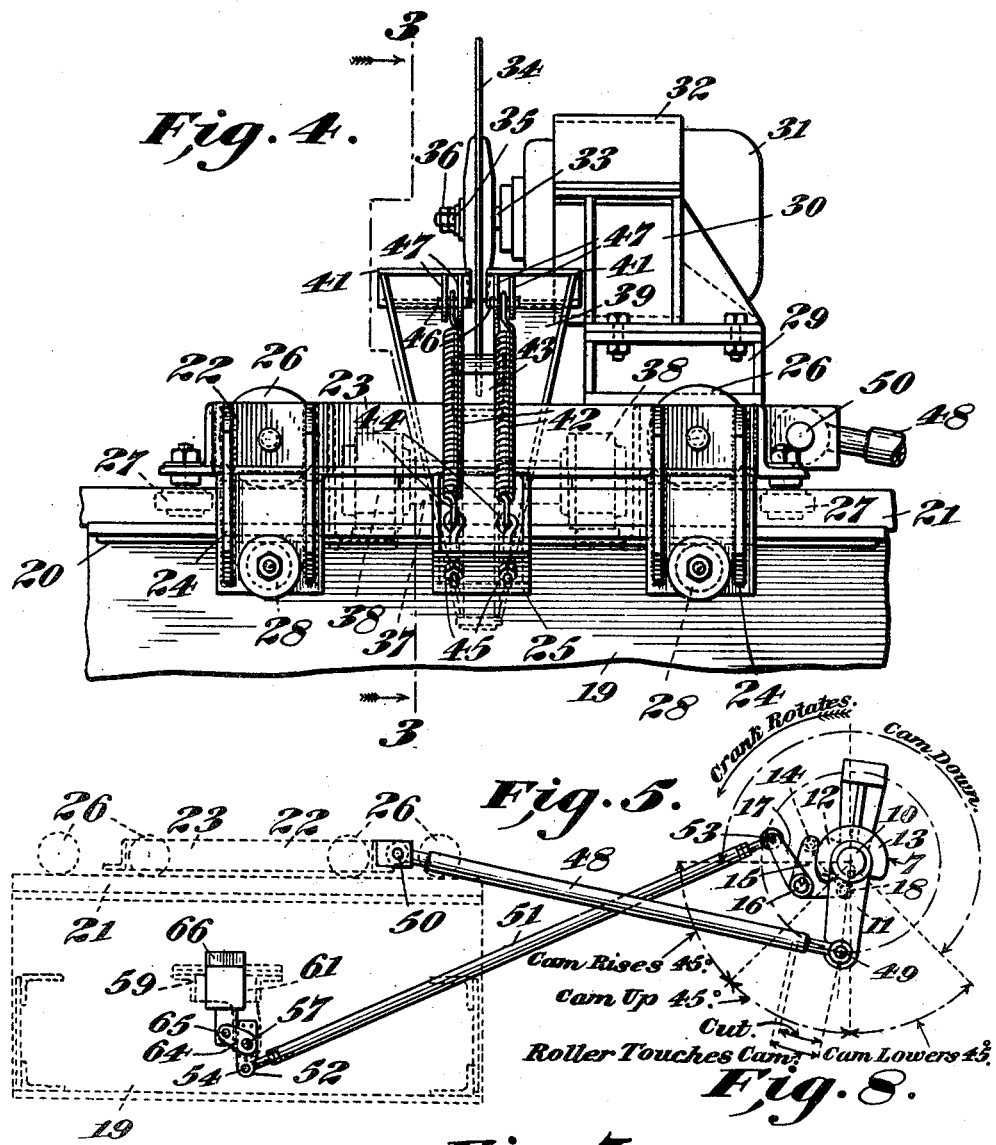
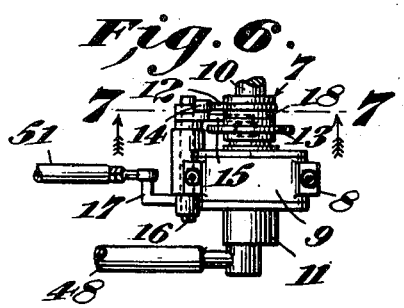
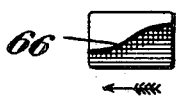
Inventor
Tom Wilson.
By R. S. C. Dougherty.
Attorney Patented Oct. 26, 1948

2,452,343

UNITED STATES PATENT OFFICE 2,452,343

APPARATUS FOR HOT SAWING

Tom Wilson, Baltimore, Md., assignor to Bethlehem Steel Company, a corporation of Pennsylvania Application May 23, 1942, Serial No. 444,179

2 Claims. (Cl. 29—69)

My invention relates to apparatus for automatically severing tubular or rod-like metal objects in motion, and is more particularly adapted for the rapid cutting of semi-finished pipes and tubes in a continuous butt-weld pipe mill.

Pipe mills of this type use large oils of skelp, which as they uncoil are welded end to end to form a long loop or series of loops on the floor of the mill. The skelp thereupon passes through a gas furnace or the like wherein it is heated to welding temperature. As it emerges from the furnace it is drawn through a bell or forming rolls, then between welding and sizing rolls, and while still hot and moving rapidly it is cut by a flying saw into commercial lengths, usually of about 20 feet. The cut lengths are passed between descaling rolls, and lastly are transferred to a cooling bed.

In one well known and often used type of flying saw, a guide or trough supports the moving pipe in a fixed position with reference to the saw carriage, while the motor and saw oscillate on a reciprocating saw carriage to cut the pipe. This type of saw in operation, however, has numerous disadvantages. The saw and motor together may easily weigh several hundred pounds. If the pipe is traveling at a speed of 300 feet a minute (which for small pipe is usually exceeded) and is being cut into 20 foot lengths, the saw must make a cut every four seconds. But tripping so much weight at high speed is a very noisy operation which when continued over any length of time causes excessive wear on the carriage; and to eliminate this condition the mill must be slowed down, thus reducing the tonnage produced, or else an undue amount of valuable time and labor must be expected to be wasted in frequent shut-downs for repairs.

One of the objects of my invention relates generally to apparatus for cutting into predetermined lengths continuously moving pipe or the like.

Another object is a cutting device which will function with reduced noise and wear on the saw carriage and other moving parts.

Another and further object is the provision of simple and positive means for pushing or swinging the pipe into cutting engagement with the saw.

Another object is a movement for a disappearing cam.

Still another object is a device whereby the motor and saw are mounted in stationary relation to the reciprocating carriage while the trough supporting the pipe oscillates to swing the pipe at regular intervals into such cutting engagement.

Other objects will appear hereinafter.

Having thus given a general description of the objects and advantages of my invention, I shall now in order to make the same more clear refer to the annexed three sheets of drawings forming a part of this specification and in which like characters of reference indicate like parts:

Figure 1 is a top plan view of a pipe cutting apparatus embodying my invention;

Fig. 2 is a side elevation of the pipe cutting apparatus shown in Figure 1;

Fig. 4 is a side elevation of the flying saw carriage;

Fig. 5 is a side elevation showing in detail the operation of the pitmans and drive cams;

Fig. 6 is a top plan view of the synchronizing means for actuating the pitmans;

Fig. 7 is a section of the motion cam and roller, taken on the line 7—7 of Figure 6; and Fig. 8 is a top plan view of a typical cam profile for the disappearing cam.

Figure 3:
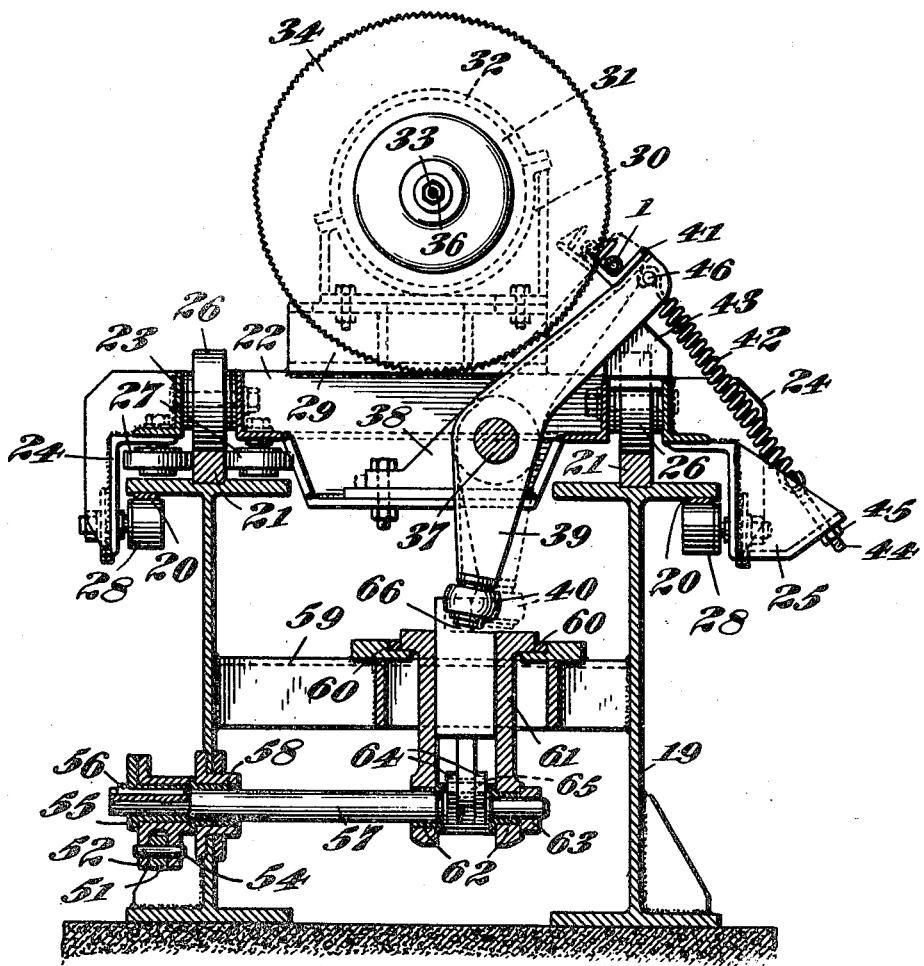
Fig. 3 is a section taken on the line 3—3 of Figure 4, illustrating more particularly the arrangement of the pipe trough and rocker arm in relation to the disappearing cam.

Referring now to the various characters of reference on the drawings, the numeral 1 indicates the moving pipe, 2 the sizing rolls, 3 the mill motor, 4 the sprocket chain, 5 the continuously variable speed transmission unit, 6 the base supporting the transmission means, and 7 the cut-synchronizing device. This cut-synchronizing device 7 comprises bearing 8, provided with caps 9, in which is journaled drive-shaft 10. Said drive-shaft 10 has on its outer end a counterbalanced crank-arm 11, and keyed on the same drive-shaft 10 are motion cam 12 and return cam 13. The sloping portion of motion cam 12 covers about 45° of arc, and makes contact with roller 14 on one of the extended arms of a bell crank follower 15 which is connected by cam shaft 16 to lever arm 17. The profile of the return cam 13 is designed so that its profile will maintain contact with the other roller 18 of the follower 15 and thus keep the desired path throughout the cycle.

Numeral 19 designates the saw base, preferably constructed of rolled steel members or the like, to which are welded or otherwise suitable fastened lower strap rails or tracks 20 and upper rails 21. Over these rails is reciprocated saw carriage 22, comprising frame 23, downwardly depending side brackets 24 and 25, moving on wheels 26 and side retaining rollers 27 and bottom retaining rollers 28. Upon frame 23 is welded motor base 29, to which is bolted motor support 30 in which saw motor 31 is mounted and held in place by strap 32. On shaft 33 of said saw motor 31 is mounted circular saw 34 and fastened by nut 35 and locknut 36 threaded onto said shaft 33. The shaft 37 journaled in bearing 38 pivotally supports the rocker arm 39. At the bottom end of rocker arm 39 is rotatably mounted the roller 40 and at the top thereof is U-shaped pipe trough or guide 41, centrally vertically bisected to permit free passage to saw 34. In normal position, before or after the pipe is cut, heavy springs 42 hold the upper portion of the rocker arm 39 firmly against the stop 43, said springs 42 being hooked to eyebolts 44 held by nuts 45 to bracket 26 at the lower end and to pins 46 in brackets 47 welded adjacent trough 41 at the upper end.

Pitman 48 joins crank arm 11 and car frame 23 by means of pins 49 and 50 respectively, while pitman 51 joins lever arm 17 and rocker lever 52 by means of pins 53 and 54. Said rocker lever 52 is attached by bushing 55 and key 56 to shaft 57 journaled through bearing 58 in saw base 19. Welded cross member 59 holds with wedges 60 the cam guide 61 at the lower end of which in bushings 62 is journaled said shaft 57 held in place by collar 63. On said shaft 57 is keyed one end of lever arm 64, the other end of which is pivotally attached by pin 65 to support and actuate in cam guide 61 the disappearing cam 66. The exact proportions of the cam 66 will vary, of course, with the thickness of pipe to be cut, but the profile of said cam will be substantially a reversed curve or ogee, as shown in Figure 8.

In operation, the pipe 1 is fed continuously through trough 41 by the action of sizing rolls 2 driven by mill motor 3, which is also connected by sprocket chain 4 or the like to continuously variable speed transmission unit 5. Said continuously variable speed transmission unit 5 transmits power at a speed adjusted to the speed of the pipe through conventional reduction gearing and the like, mounted on base 6, to cut-synchronizing device 7. As driven shaft 10 of said synchronizing device 7 rotates in bearing 8, crank arm 11 operates the pitman 48 to advance saw carriage 22 at substantially the same forward speed as the pipe 1, while pitman 51 raises the disappearing cam 56 to throw the advancing rocker arm 39 and lift the soft hot pipe 1 in pipe trough 41 into cutting engagement with the rapidly rotating circular saw 34. After the cut is made, the pipe 1 and trough 41 are pulled back by the springs 42, the saw carriage 22 is retracted by pitman 48 to initial position, and the cycle is repeated. Thus roller 14 on cam follower 15 moves outwardly during 45° of the cycle; travels on the sloping portion of the motion cam 12 during the actual cutting, for 45° of the cycle; moves inwardly through 45° of the cycle; and remains in the inward position for the balance of the cycle.

Although I have shown and described my invention in considerable detail, I do not desire to be limited to the exact construction shown and described, but may use such substitutions, modifications, or equivalents thereof, as are embraced within the scope of my invention, or as are pointed out in the appended claims.

Having thus described my invention what I claim as new and useful and desire to secure by Letters Patent is:

1. A machine for severing continuously moving pipe or the like comprising a frame, a reciprocable carriage, a continuously driven saw mounted on the carriage, a rocker arm pivoted to the carriage, a guide for the pipe supported on the rocker arm, a disappearing cam adapted for vertical reciprocation upon the frame beneath the carriage, a cam roller at the bottom of the rocker arm for contacting the disappearing cam, a motor mounted adjacent the frame for reciprocating the carriage, a gear driven by the motor having an extended shaft, a cam fixed to the outer end of said extended gear shaft adapted for rotation therewith, a cam shaft mounted parallel to the gear shaft, a follower on the cam shaft, a roller rotatably mounted on the follower for engaging the cam, means for holding the roller at all times in contact with the cam, a lever arm mounted on the cam shaft, a pitman pivoted to the cam shaft, and co-acting rocking levers pivotally connected between the pitman and the disappearing cam for reciprocating said disappearing cam to bring the pipe in the pipe guide against the saw for cutting the pipe.

2. A machine for severing continuously moving pipe or the like into uniform lengths, comprising a stationary frame of rolled members, a carriage adapted for reciprocation on said stationary frame, a continuously driven saw mounted on the carriage, a rocker arm pivoted to the bottom of the carriage, a guide for the moving pipe at the upper end of the rocker arm, a roller at the lower end of the rocker arm, a disappearing cam on the stationary frame adapted to be vertically reciprocated into the path of the roller as it advances with the car to lift the pipe guide to the saw and cut the pipe, a lever arm pivoted to the disappearing cam, a shaft journaled in the stationary frame for actuating the lever arm, a rocker lever attached to said shaft, driving means adjacent the stationary frame for actuating the machine, a drive shaft on the driving means, a crank arm mounted on the drive shaft, a pitman having its ends pivoted to the crank arm and to the carriage for reciprocating the carriage, a motion cam and a return cam mounted on the drive shaft, a cam shaft mounted adjacent the drive shaft, a bell crank follower mounted on the cam shaft, a roller on the bell crank follower making contact with the motion cam to actuate the disappearing cam, a second roller on the bell crank follower making contact with the return cam to complete the path of the follower, a second lever arm mounted on the cam shaft, and a second pitman joining the second lever arm with the shaft journaled in the stationary frame for reciprocating vertically the disappearing cam.

TOM WILSON.

REFERENCES CITED

The following references are of record in the file of this patent:

UNITED STATES PATENTS

| Number | Name | Date |
| --- | --- | --- |
| 549,707 | Denney | Nov. 12, 1895 |
| 558,646 | Hardie | Apr. 21, 1896 |
| 1,418,437 | Grupe | June 6, 1922 |
| 1,533,263 | Pritchard | Apr. 14, 1925 |
| 1,777,802 | Maltby | Oct. 7, 1930 |
| 1,946,926 | Barton | Feb. 13, 1934 |
| 1,990,481 | Garling | Feb. 12, 1935 |
| 2,013,303 | Garling | Sept. 3, 1935 |
| 2,079,974 | Traut | May 11, 1937 |

Certificate of Correction

Patent No. 2,452,343.

October 26, 1948.

TOM WILSON

It is hereby certified that errors appear in the printed specification of the above numbered patent requiring correction as follows:

Column 1, line 6, for the word "oils" read *coils*; column 2, line 51, for "suitable" read *suitably*; column 3, line 46, for "driven" read *drive*; and that the said Letters Patent should be read with these corrections therein that the same may conform to the record of the case in the Patent Office.

Signed and sealed this 15th day of February, A. D. 1949.

[SEAL]

THOMAS F. MURPHY,
*Assistant Commissioner of Patents.*